US009942467B2

(12) United States Patent
Kim

(10) Patent No.: US 9,942,467 B2
(45) Date of Patent: Apr. 10, 2018

(54) ELECTRONIC DEVICE AND METHOD FOR ADJUSTING CAMERA EXPOSURE

(71) Applicant: Samsung Electronics Co., Ltd., Suwon-si, Gyeonggi-do (KR)

(72) Inventor: Dongsoo Kim, Gwacheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 39 days.

(21) Appl. No.: 15/248,606

(22) Filed: Aug. 26, 2016

(65) Prior Publication Data
US 2017/0070666 A1    Mar. 9, 2017

(30) Foreign Application Priority Data

Sep. 9, 2015 (KR) .................. 10-2015-0127826

(51) Int. Cl.
*H04N 5/235* (2006.01)
*H04N 5/228* (2006.01)
*G03B 7/00* (2014.01)
*H04N 5/232* (2006.01)

(52) U.S. Cl.
CPC ..... *H04N 5/23216* (2013.01); *H04N 5/23293* (2013.01)

(58) Field of Classification Search
CPC ............ H04N 5/2353; H04N 13/0203; H04N 5/23212; H04N 5/23216; H04N 5/23229; H04N 5/23241; H04N 5/23293; H04N 5/2352; G06F 3/017
See application file for complete search history.

(56) References Cited

U.S. PATENT DOCUMENTS

| | | | |
|---|---|---|---|
| 8,149,323 B2 | 4/2012 | Li et al. | |
| 8,625,021 B2* | 1/2014 | Imai | H04N 5/23293 348/266 |
| 8,665,355 B2* | 3/2014 | Imai | H04N 9/735 348/333.02 |
| 8,823,829 B2* | 9/2014 | Imai | H04N 5/142 348/222.1 |
| 8,934,043 B2* | 1/2015 | Parulski | H04N 1/00183 348/333.11 |

(Continued)

FOREIGN PATENT DOCUMENTS

| | | |
|---|---|---|
| KR | 10-1231474 B1 | 2/2013 |
| KR | 10-1275899 B1 | 6/2013 |
| KR | 10-2015-0027137 A | 3/2015 |

*Primary Examiner* — Chia-Wei A Chen
(74) *Attorney, Agent, or Firm* — Jefferson IP Law, LLP

(57) ABSTRACT

An apparatus and method for adjusting camera exposure are disclosed. The apparatus includes an electronic device The electronic device includes a camera, a display, and a processor. The processor is configured to receive a first user input for selecting a first area of a preview image from a first screen for displaying the preview image, to identify an exposure state of the selected first area responding to the first user input, to provide a second screen for displaying a portion of the preview image corresponding to the first area if the exposure state of the selected first area is an overexposure state, to receive a second user input for selecting a second area of the preview image from the second screen, and to adjust an exposure of the preview image based on the exposure state responding to the second user input.

20 Claims, 9 Drawing Sheets

(56) References Cited

U.S. PATENT DOCUMENTS

| | | | |
|---|---|---|---|
| 9,307,137 B2* | 4/2016 | Ito | H04N 5/23212 |
| 9,525,811 B2* | 12/2016 | Moskovchenko | H04N 5/2354 |
| 2003/0098922 A1* | 5/2003 | Barkan | H04N 5/2351 |
| | | | 348/362 |
| 2008/0297597 A1* | 12/2008 | Inomata | G03B 7/00 |
| | | | 348/80 |
| 2010/0315521 A1* | 12/2010 | Kunishige | H04N 5/232 |
| | | | 348/220.1 |
| 2014/0037135 A1 | 2/2014 | Kutliroff et al. | |
| 2015/0043811 A1* | 2/2015 | Prabhudesai | G06T 5/008 |
| | | | 382/164 |
| 2016/0125575 A1* | 5/2016 | Takahashi | G06T 5/50 |
| | | | 382/275 |
| 2017/0064179 A1* | 3/2017 | Richards | G06K 9/4642 |

* cited by examiner

<601>

<602>

ELECTRONIC DEVICE AND METHOD FOR ADJUSTING CAMERA EXPOSURE

CROSS-REFERENCE TO RELATED APPLICATION(S)

This application claims the benefit under 35 U.S.C. § 119(a) of a Korean patent application filed on Sep. 9, 2015 in the Korean Intellectual Property Office and assigned Serial number 10-2015-0127826, the entire disclosure of which is hereby incorporated by reference.

TECHNICAL FIELD

The present disclosure relates to a method for adjusting a camera exposure of a preview image obtained through a camera module, and an electronic device implementing the method.

BACKGROUND

Electronic devices can convert an image obtained by photoelectric converting devices of camera modules such as a charge coupled device (CCD) or complementary metal-oxide semiconductor (CMOS), and output a preview image by performing a specific image processing for a photo-electrically converted image signal. The camera module included in such electronic devices can detect brightness of a subject image and perform an exposure function for adjusting brightness of an output image according to the brightness of the subject image. For a more accurate exposure function, the electronic device can receive a user input for selecting a specific area from a preview image and adjust an exposure of the preview image based on a brightness value of the specific area according to the user input.

The above information is presented as background information only to assist with an understanding of the present disclosure. No determination has been made, and no assertion is made, as to whether any of the above might be applicable as prior art with regard to the present disclosure.

SUMMARY

Although electronic devices having camera functions generally adjust an exposure based on brightness information of a specific area in a preview image, if a brightness difference in different areas of the preview image is great, there may be problems in adjusting the exposure correctly according to the users' intentions for the electronic devices.

Aspects of the present disclosure are to address at least the above-mentioned problems and/or disadvantages and to provide at least the advantages described below. Accordingly, an aspect of the present disclosure is to provide an apparatus and a method for identifying an exposure state of a partial area of a preview image and displaying a screen based on the identification result so that a user can easily and conveniently perform an exposure adjustment.

In accordance with various aspects of the present disclosure, an electronic device may include a housing, at least one camera included in the housing and configured to obtain a preview image, a display module included in the housing and configured to display the preview image, a processor included in the housing and configured to electrically connect with the at least one camera and/or the display module, and a memory configured to electrically connect with the processor. The memory can store instructions so that the processor receives a first user input for selecting a first area of the preview image from a first screen for displaying the preview image, identifies an exposure state of the selected first area in response to the first user input, provides a second screen for displaying a portion of the preview image corresponding to the selected first area if the exposure state of the selected first area is an over-exposure state, receives a second user input for selecting a second area of the preview image from the second screen, and adjusts an exposure of the preview image based on the exposure state responding to the second user input.

In accordance with another aspect of the present disclosure, a method for operating an electronic device is provided. The method includes identifying an exposure state of the selected first area responding to the first user input, providing a second screen for displaying a portion of the preview image corresponding to the first area if the exposure state of the selected first area is an over-exposure state, receiving a second user input for selecting a second area of the preview image from the second screen, and adjusting an exposure of the preview image based on the exposure state of the selected second area responding to the second user input.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
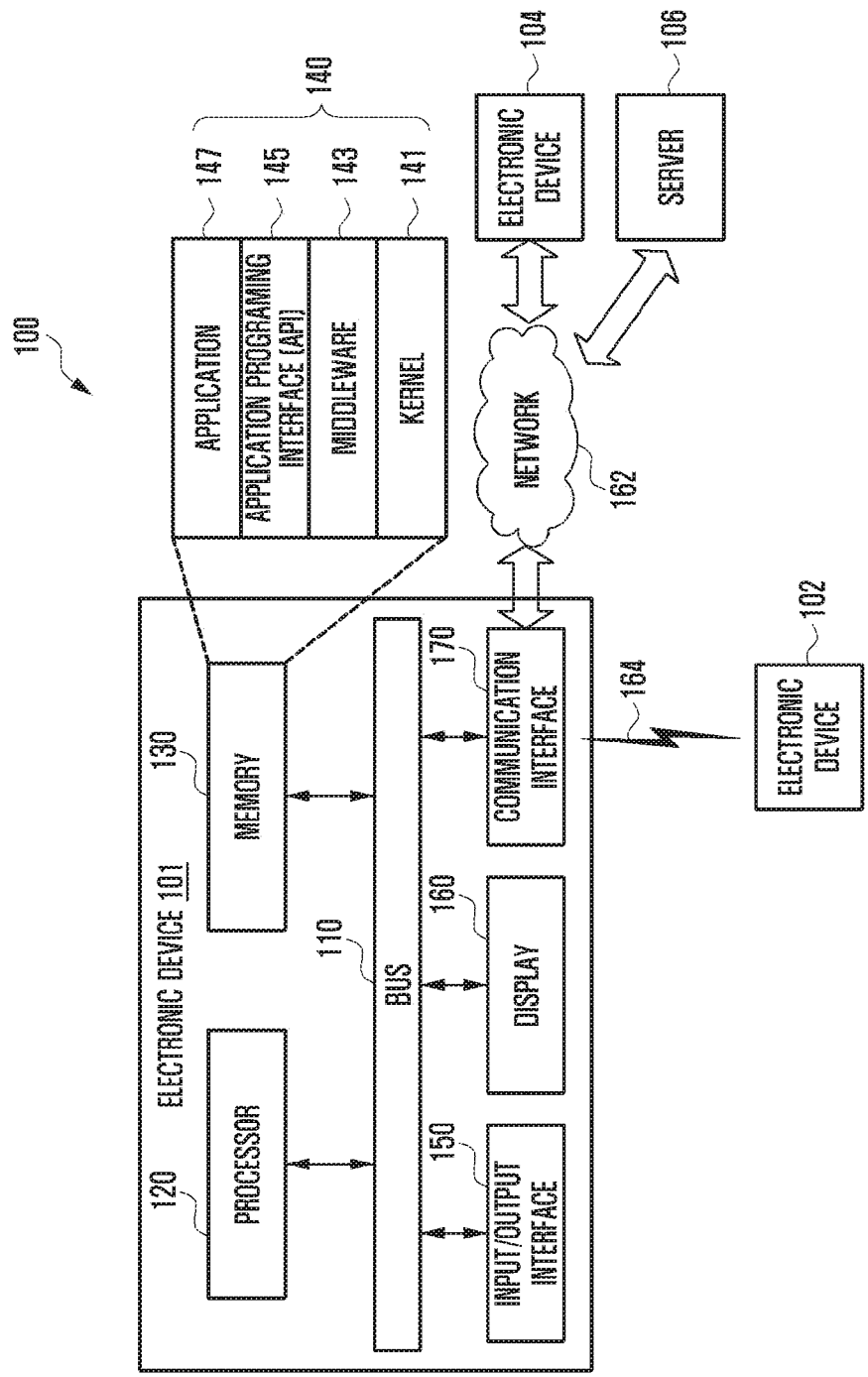
FIG. 1 illustrates a network environment including an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly indicates otherwise. Thus, for example, reference to "a component surface" includes reference to one or more of such surfaces.

In this disclosure, the expression "A or B" or "at least one of A and/or B" may include A, may include B, or may include both A and B. Expressions including ordinal numbers, such as "first" and "second," etc., may modify various elements. However, the above expressions do not limit the sequence and/or importance of the elements and are used merely for the purpose to distinguish an element from the other elements. In case where a certain (e.g., the first) element is referred to as being "connected" or "accessed" (functionally or communicatively) to other (e.g., the second) element, it should be understood that the element is connected or accessed directly to the other element or through another (e.g., the third) element. In this disclosure, the expression "configured to" may be used, depending on situations, interchangeably with "adapted to", "having the ability to", "modified to", "made to", "capable of", or "designed to". In some situations, the expression "device configured to" may mean that the device may operate with other device(s) or other component(s). For example, the expression "processor configured to perform A, B and C" may mean a dedicated processor (e.g., an embedded processor) for performing the above operations, or a general-purpose processor (e.g., central processing unit (CPU) or an application processor (AP)) capable of performing the above operations by executing one or more software programs stored in a memory device. An electronic device according to various embodiments of this disclosure may include at least one of a smart phone, a tablet personal computer (PC), a mobile phone, a video phone, an e-book reader, a desktop PC, a laptop PC, a netbook computer, a workstation, a server, a personal digital assistant (PDA), a portable multimedia player (PMP), a Moving Picture Experts Group phase 1 or phase 2 (MPEG-1 or MPEG-2) audio layer 3 (MP3) player, a medical device, a camera, and a wearable device. For example, a wearable device may include at least one of an accessory type (e.g., a watch, a ring, a bracelet, an anklet, a necklace, an electronic accessory, eyeglasses, contact lenses, or a head-mounted device (HMD)), a textile or cloth assembled type (e.g., electronic clothing), a body attached type (e.g., a skin pad or tattoo), and a body transplant circuit. In some embodiments, an electronic device may include at least one of a television (TV), a digital versatile disc (DVD) player, an audio device, a refrigerator, an air-conditioner, a vacuum cleaner, an oven, a microwave, a washing machine, an air cleaner, a set-top box, a home automation control panel, a security control panel, a media box (e.g., Samsung HomeSync™, Apple TV™, or Google TV™), a game console (e.g., Xbox™, PlayStation™), an electronic dictionary, an electronic key, a camcorder, and an electronic frame.

In various embodiments of the present disclosure, an electronic device may include at least one of various medical devices (e.g., magnetic resonance angiography (MRA), magnetic resonance imaging (MRI), computed tomography (CT), a scanning machine, an ultrasonic wave device, etc.), a navigation device, a global navigation satellite system (GNSS), an event data recorder (EDR), a flight data recorder (FDR), a vehicle infotainment device, an electronic equipment for a ship (e.g., navigation equipment for a ship, gyrocompass, etc.), avionics, a security device, a head unit or device for a vehicle, an industrial or home robot, a drone, an automated teller machine (ATM), a point of sales (POS), and various Internet of things (IoT) devices (e.g., a lamp, various sensors, a sprinkler, a fire alarm, a thermostat, a street light, a toaster, athletic equipment, a hot water tank, a heater, a boiler, etc.). According to a certain embodiment, an electronic device may include at least one of furniture, a portion of a building/structure or car, an electronic board, an electronic signature receiving device, a projector, and various measuring meters (e.g., a water meter, an electric meter, a gas meter, a wave meter, etc.). In various embodiments, an electronic device may be flexible or a combination of two or more of the aforementioned devices. An electronic device according to various embodiments of this disclosure is not limited to the aforementioned devices. In this disclosure, the term a user may refer to a person who uses an electronic device, or a machine (e.g., an artificial intelligence device) which uses an electronic device.

FIG. 1 is a block diagram illustrating a network environment 100 including therein an electronic device 101 in accordance with various embodiments of the present disclosure.

Referring to FIG. 1, the electronic device 101 may include, but is not limited to, a bus 110, a processor 120, a memory 130, an input/output interface 150, a display 160, and a communication interface 170. The bus 110 may be a circuit designed for connecting the above-discussed elements and communicating data (e.g., a control message) between such elements. The processor 120 may receive commands from the other elements (e.g., the memory 130, the input/output interface 150, the display 160, or the communication interface 170, etc.) through the bus 110, interpret the received commands, and perform the arithmetic or data processing based on the interpreted commands. The memory 130 may store therein commands or data received from or created at the processor 120 or other elements (e.g., the input/output interface 150, the display 160, or the communication interface 170, etc.). The memory 130 may include programming modules 140 such as a kernel 141, a middleware 143, an application programming interface (API) 145, and an application 147. Each of the programming modules may be composed of software, firmware, hardware, and any combination thereof.

The kernel 141, as illustrated in FIG. 1, may control or manage system resources (e.g., the bus 110, the processor 120, the memory 130, etc.) used to execute operations or functions implemented by other programming modules (e.g., the middleware 143, the API 145, and the application 147). Also, the kernel 141 may provide an interface capable of accessing and controlling or managing the individual elements of the electronic device 101 by using the middleware 143, the API 145, or the application 147.

The middleware 143 may serve to go between the API 145 or the application 147 and the kernel 141 in such a manner that the API 145 or the application 147 communicates with the kernel 141 and exchanges data therewith. Also, in relation to work requests received from one or more applications 147 and/or the middleware 143, for example, may perform load balancing of the work requests by using a method of assigning a priority, in which system resources (e.g., the bus 110, the processor 120, the memory 130, etc.) of the electronic device 101 can be used, to at least one of the one or more applications 147. The API 145 is an interface through which the application 147 is capable of controlling a function provided by the kernel 141 or the middleware 143, and may include, for example, at least one interface or function for file control, window control, image processing, character control, or the like. The input/output interface 150 may deliver commands or data, entered by a user through an input/output unit or device (e.g., a sensor, a keyboard, or a touch screen), to the processor 120, the memory 130, or the communication interface 170 via the bus 110.

The display module 160 may include, for example, a liquid crystal display (LCD), a light emitting diode (LED) display, an organic LED (OLED) display, a micro electro mechanical system (MEMS) display, or an electronic paper display. The display 160 may display various types of contents (e.g., text, images, videos, icons, or symbols) for users. The display module 160 may include a touch screen, and may receive, for example, a touch, gesture, proximity, or hovering input by using an electronic device or a part of the user's body.

The communication interface 170 may establish communication between the electronic device 101 and any external device (e.g., the first external electronic device 102, the second external electronic device 104, or the server 106). For example, the communication interface 170 may be connected with a network 162 through wired or wireless communication 164 and thereby communicate with any external device (e.g., the second external electronic device 104, or the server 106).

Wireless communication may use, as cellular communication protocol, at least one of long-term evolution (LTE), LTE advanced (LTE-A), code division multiple access (CDMA), wideband CDMA (WCDMA), universal mobile telecommunications system (UMTS), wireless broadband (WiBro), global system for mobile communications (GSM), and the like, for example. A short-range communication may include, for example, at least one of Wi-Fi, Bluetooth (BT), near field communication (NFC), magnetic secure transmission or near field magnetic data stripe transmission (MST), and GNSS, and the like. The GNSS may include at least one of, for example, a global positioning system (GPS), a global navigation satellite system (GLONASS), a BeiDou navigation satellite system (hereinafter, referred to as "BeiDou"), and Galileo (European global satellite-based navigation system). Hereinafter, the "GPS" may be interchangeably used with the "GNSS" in the present disclosure.

The wired communication may include, but not limited to, at least one of universal serial bus (USB), high definition multimedia interface (HDMI), recommended standard 232 (RS-232), or plain old telephone service (POTS). The network 162 includes, as a telecommunications network at least one of a computer network (e.g., local area network (LAN) or wide area network (WAN)), the internet, and a telephone network. The types of the first and second external electronic devices 102 and 104 may be the same as or different from the type of the electronic device 101. The server 106 may include a group of one or more servers. A portion or all of operations performed in the electronic device 101 may be performed in one or more other electronic devices 102 or 104 or the server 106. In the case where the electronic device 101 performs a certain function or service automatically or in response to a request, the electronic device 101 may request at least a portion of functions related to the function or service from another electronic device 102 or 104 or the server 106 instead of or in addition to performing the function or service for itself. The other electronic device 102 or 104 or the server 106 may perform the requested function or additional function, and may transfer a result of the performance to the electronic device 101. The electronic device 101 may additionally process the received result to provide the requested function or service. To this end, for example, a cloud computing technology, a distributed computing technology, or a client-server computing technology may be used.

Figure 2:
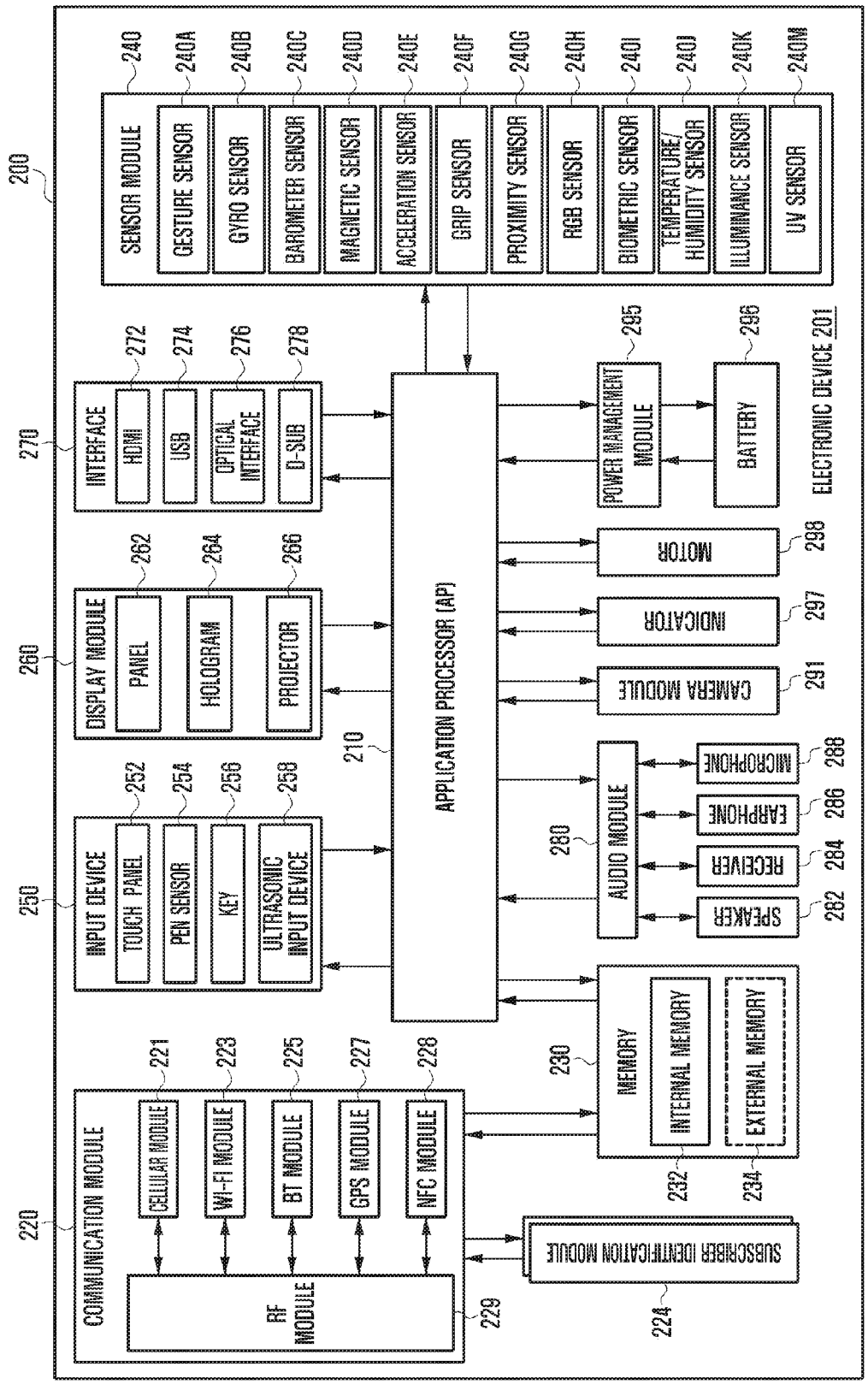
FIG. 2 is a block diagram illustrating an electronic device according to various embodiments of the present disclosure.

FIG. 2 is a block diagram illustrating an electronic device 201 according to various embodiments of the present disclosure. The electronic device 201 may form, for example, the whole or part of the electronic device 101 shown in FIG. 1.

Referring to FIG. 2, the electronic device 201 may include at least one AP 210, a communication module 220, a subscriber identification module (SIM) card 224, a memory 230, a sensor module 240, an input unit or input device 250, a display or display module 260, an interface 270, an audio module 280, a camera module 291, a power management module 295, a battery 296, an indicator 297, and a motor 298. The processor 210 is capable of driving, for example, an operating system or an application program to control a plurality of hardware or software components connected to the processor 210, processing various data, and performing operations. The processor 210 may be implemented as, for example, a system on chip (SoC). According to an embodiment, the processor 210 may further include a graphics processing unit (GPU) and/or an image signal processor.

The processor 210 may also include at least part of the components shown in FIG. 2, e.g., a cellular module 221. The processor 210 is capable of loading commands or data received from at least one of other components (e.g., a non-volatile memory) on a volatile memory, processing the loaded commands or data. The processor 210 is capable of storing various data in a non-volatile memory. The communication module 220 (e.g., the communication interface 170) may perform a data communication with any other electronic device (e.g., the electronic device 104 or the server 106) connected to the electronic device 201 (e.g., the electronic device 101) through the network. According to an embodiment, the communication module 220 may include therein a cellular module 221, a Wi-Fi module 223, a BT module 225, a GNSS or GPS module 227, an NFC module 228, and a radio frequency (RF) module 229. The cellular module 221 is capable of providing a voice call, a video call, a short message service (SMS), an internet service, etc., through a communication network, for example. According to an embodiment, the cellular module 221 is capable of identifying and authenticating an electronic device 201 in a communication network by using a SIM 224 (e.g., a SIM card). According to an embodiment, the cellular module 221 is capable of performing at least part of the functions provided by the processor 210. According to an embodiment, the cellular module 221 is also capable of including a communication processor (CP).

As illustrated in FIG. 2, the Wi-Fi module 223, the BT module 225, the GNSS module 227, and the NFC module 228 are each capable of including a processor for processing data transmitted or received through the corresponding module.

The MST module 228 is capable of including a processor for processing data transmitted or received through the corresponding module. According to various embodiments, at least part of the cellular module 221, Wi-Fi module 223, BT module 225, GNSS module 227, NFC module 228, and MST module (e.g., two or more modules) may be included in one integrated chip (IC) or one IC package. The RF module 229 is capable of transmission/reception of communication signals, e.g., RF signals. The RF module 229 is capable of including a transceiver, a power amp module (PAM), a frequency filter, a low noise amplifier (LNA), an antenna, etc. According to an embodiment, at least one of the cellular module 221, the Wi-Fi module 223, the BT module 225, the GNSS module 227, and the NFC module 228 is capable of transmission/reception of RF signals through a separate RF module. The SIM module 224 is capable of including a card including a SIM and/or an embodied SIM. The SIM module 224 is also capable of containing unique identification information, e.g., integrated circuit card identifier (ICCID), or subscriber information, e.g., international mobile subscriber identity (IMSI).

As illustrated in FIG. 2, memory 230 (e.g., memory 103 shown in FIG. 1) is capable of including a built-in or internal memory 232 and/or an external memory 234. The built-in or internal memory 232 is capable of including at least one of the following: a volatile memory, e.g., a dynamic random access memory (DRAM), a static RAM (SRAM), a synchronous dynamic RAM (SDRAM), etc.; and a non-volatile memory, e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., an NAND flash memory, an NOR flash memory, etc.), a hard drive, a solid state drive (SSD), etc.

The external memory 234 is also capable of including a flash drive, e.g., a compact flash (CF), a secure digital (SD), a micro-SD, a mini-SD, an extreme digital (xD), a multimedia card (MMC), a memory stick, etc. The external memory 234 is capable of being connected to the electronic device 201, functionally and/or physically, through various interfaces. The memory 230 according to various embodiments of the present disclosure can store instructions for the processor 210 to receive a first user input for selecting a first area of a preview image from a first screen for displaying the preview image, to identify an exposure state of the selected first area responding to the first user input, to provide a second screen for displaying a preview image corresponding to the first area if the exposure state of the selected first area is an over-exposure state, to receive a second user input for selecting a second area of the preview image from the second screen, and to adjust an exposure of the preview image based on the exposure state responding to the second user input.

The memory 230 according to various embodiments of the present disclosure can store instructions for the processor 210 to calculate an average brightness value of the first area by collecting brightness values of each unit section in the first area, and to identify whether a ratio of unit sections having a difference greater than a predetermined value from the average brightness value of the first area is equal to or greater than a predetermined ratio.

The memory 230 according to various embodiments of the present disclosure can store instructions for the processor 210 to determine that the exposure state of the first area is an over-exposure state, if the ratio of unit sections having a difference greater than a predetermined value from the average brightness value of the first area is equal to or greater than a predetermined ratio.

The memory 230 according to various embodiments of the present disclosure can store a switching table including information of a switch drive signal corresponding to at least one electric connector in each frequency band.

The memory 230 according to various embodiments of the present disclosure can store instructions for the processor 210 to determine that the exposure state of the first area is a proper exposure state, if the ratio of unit sections having a difference greater than a predetermined value from the average brightness value of the first area is less than a predetermined ratio.

The memory 230 according to various embodiments of the present disclosure can store instructions for the processor 210 to provide the second screen for displaying an image enlarged from the preview image corresponding to the first area through at least a partial area of the first screen.

The memory 230 according to various embodiments of the present disclosure can store instructions for the processor 210 to provide the second screen for displaying the preview image corresponding to the first area through the whole display module, and to provide the first screen for displaying the whole preview image through at least a partial area of the second screen.

The memory 230 according to various embodiments of the present disclosure can store instructions for the processor 210 to provide the second screen for displaying the preview image corresponding to the first area through the whole display module, and to provide the first screen for displaying the whole preview image through at least a partial area of the second screen.

The memory 230 according to various embodiments of the present disclosure can store instructions for the processor 210 to provide an exposure adjustment slide bar through at least a partial area of the first screen if the exposure state of the first area is an over-exposure state, and to adjust an exposure of the preview image based on a user input received through the exposure adjustment slide bar.

The memory 230 according to various embodiments of the present disclosure can store instructions for the processor 210 to perform a function related to the at least one camera if the exposure state of the first area is a proper exposure state.

The memory 230 according to various embodiments of the present disclosure can store instructions for the processor 210 to obtain the preview image through the at least one camera module responding to a request for executing a camera application.

The sensor module 240 is capable of measuring/detecting a physical quantity or an operation state of the electronic device 201, and converting the measured or detected information into an electronic signal. The sensor module 240 is capable of including at least one of the following: a gesture sensor 240A, a gyro sensor 240B, an atmospheric pressure or barometer sensor 240C, a magnetic sensor 240D, an acceleration sensor 240E, a grip sensor 240F, a proximity sensor 240G, a color or RGB sensor 240H (e.g., a red, green and blue (RGB) sensor), a biometric sensor 240I, a temperature/humidity sensor 240J, an illuminance sensor 240K, and an ultraviolet (UV) sensor 240M.

Additionally or alternatively, the sensor module 240 is capable of further including on or more of the following sensors or operations (not shown): an electronic nose (E-nose) sensor, an electromyography (EMG) sensor, an electroencephalogram (EEG) sensor, an electrocardiogram (ECG) sensor, an infrared (IR) sensor, an iris sensor and/or a fingerprint sensor.

The sensor module 240 is capable of further including a control circuit for controlling one or more sensors included therein.

In various embodiments of the present disclosure, the electronic device 201 is capable of including a processor, configured as part of the processor 210 or a separate component, for controlling the sensor module 240. In this case, while the processor 210 is operating in a sleep mode, the processor is capable of controlling the sensor module 240.

The input device 250 is capable of including a touch panel 252, a (digital) pen sensor (digital pen or stylus) 254, a key 256, or an ultrasonic input unit or device 258. The touch panel 252 may be implemented with at least one of the following: a capacitive touch system, a resistive touch system, an infrared touch system, and an ultrasonic touch system. The touch panel 252 may further include a control circuit. The touch panel 252 may also further include a tactile layer to provide a tactile response to the user. The (digital) pen sensor 254 may be implemented with a part of the touch panel or with a separate recognition sheet. The key 256 may include a physical button, an optical key, or a keypad. The ultrasonic input unit 258 is capable of detecting ultrasonic waves, created in an input tool, through a microphone 288, and identifying data corresponding to the detected ultrasonic waves.

The display 260 (e.g., the display 106 shown in FIG. 1) is capable of including a panel 262, a hologram unit or device 264, or a projector 266. The panel 262 may include the same or similar configurations as the display 106 shown in FIG. 1. The panel 262 may be implemented to be flexible, transparent, or wearable.

The panel 262 may also be incorporated into one module together with the touch panel 252. The hologram unit 264 is capable of showing a stereoscopic image in the air by using light interference. The projector 266 is capable of displaying an image by projecting light onto a screen. The screen may be located inside or outside of the electronic device 201. According to an embodiment, the display 260 may further include a control circuit for controlling the panel 262, the hologram unit 264, or the projector 266.

The interface 270 is capable of including an HDMI 272, a USB 274, an optical interface 276, or a D-subminiature (D-sub) 278. The interface 270 may be included in the communication interface 107 shown in FIG. 1. Additionally or alternatively, the interface 270 is capable of including a mobile high-definition link (MHL) interface, an SD card/MMC interface, or an infrared data association (IrDA) standard interface.

The audio module 280, as illustrated in FIG. 2, is capable of providing bidirectional conversion between a sound and an electronic signal. At least part of the components in the audio module 280 may be included in the input/output interface 145 shown in FIG. 1.

The audio module 280 is also capable of processing sound information input or output through a speaker 282, a receiver 284, earphones 286, microphone 288, etc.

The camera module 291 refers to a device capable of taking both still and moving images. According to an embodiment, the camera module 291 is capable of including one or more image sensors (e.g., a front image sensor or a rear image sensor), a lens, an image signal processor (ISP), a flash (e.g., an LED or xenon lamp), etc.

The power management module 295 is capable of managing power of the electronic device 201. According to an embodiment, the power management module 295 is capable of including a power management IC (PMIC), a charger IC, or a battery or fuel gauge. The PMIC may employ wired charging and/or wireless charging methods. Examples of the wireless charging method are magnetic resonance charging, magnetic induction charging, and electromagnetic charging. To this end, the PIMC may further include an additional circuit for wireless charging, such as a coil loop, a resonance circuit, a rectifier, etc. The battery gauge is capable of measuring the residual capacity, charge in voltage, current, or temperature of the battery 296. The battery 296 takes the form of either a rechargeable battery or a solar battery.

The indicator 297 is capable of displaying a specific status of the electronic device 201 or a part thereof (e.g., the processor 210), e.g., a boot-up status, a message status, a charging status, etc. The motor 298 is capable of converting an electrical signal into mechanical vibrations, such as, a vibration effect, a haptic effect, etc. Although not shown, the electronic device 201 is capable of further including a processing unit (e.g., GPU) for supporting a mobile TV. The processing unit for supporting a mobile TV is capable of processing media data pursuant to standards, e.g., digital multimedia broadcasting (DMB), digital video broadcasting (DVB), or MediaFlo™, etc.

Each of the elements described in the present disclosure may be formed with one or more components, and the names of the corresponding elements may vary according to the type of the electronic device. In various embodiments, the electronic device may include at least one of the above described elements described in the present disclosure, and may exclude some of the elements or further include other additional elements. Further, some of the elements of the electronic device according to various embodiments may be coupled to form a single entity while performing the same functions as those of the corresponding elements before the coupling.

Figure 3:
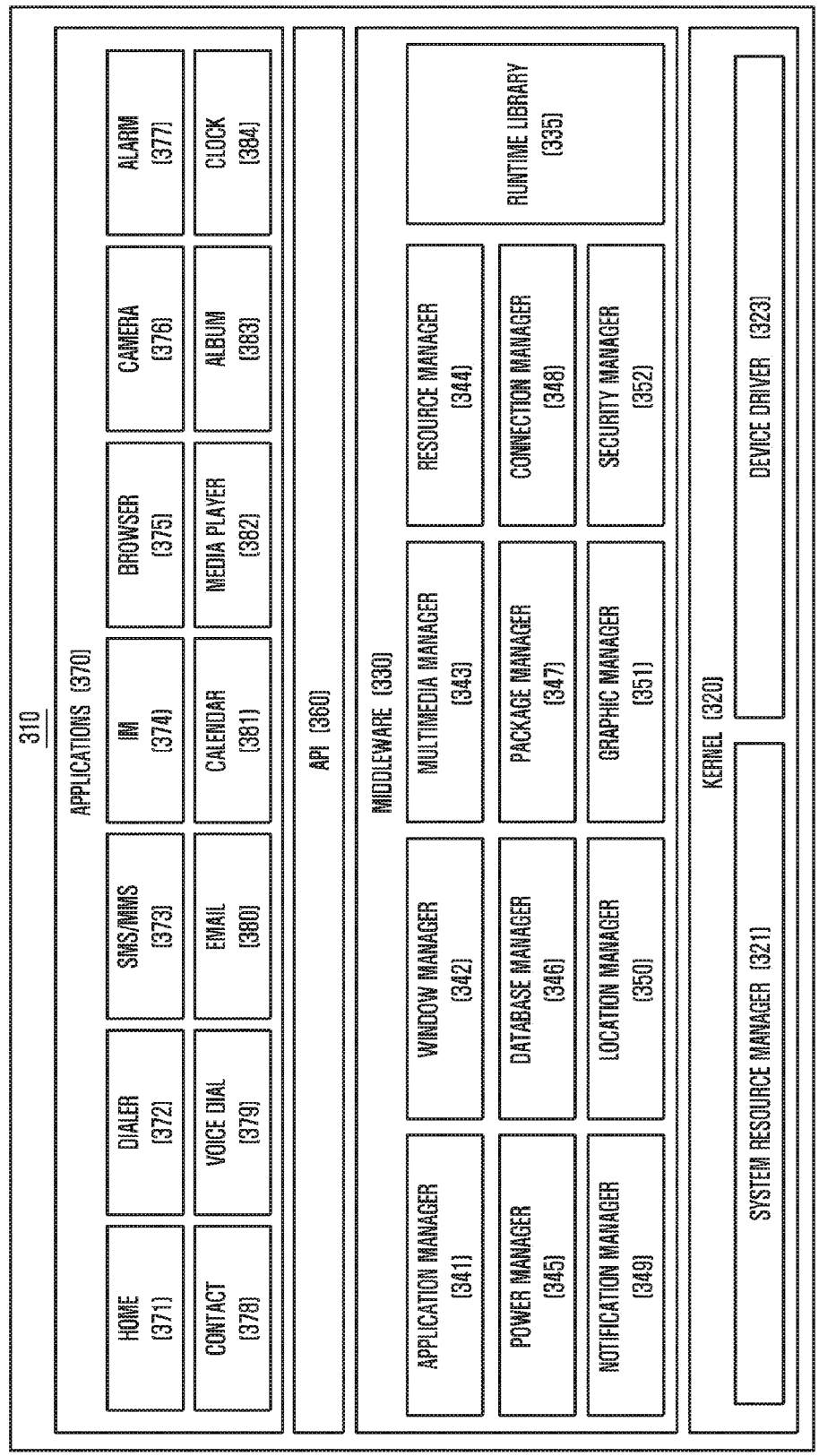
FIG. 3 is a block diagram illustrating a program module according to various embodiments of the present disclosure.

FIG. 3 is a block diagram illustrating a configuration of a programming module 310 according to various embodiments of the present disclosure.

The programming module 310 may be included (or stored) in the electronic device 100 (e.g., the memory 130) illustrated in FIG. 1, or may be included (or stored) in the electronic device 201 (e.g., the memory 230) illustrated in FIG. 2. At least a part of the programming module 310 may be implemented in software, firmware, hardware, or a combination of two or more thereof. The programming module 310 may be implemented in hardware (e.g., the hardware 200 of FIG. 2), and may include an operating system (OS) controlling resources related to an electronic device (e.g., the electronic device 100) and/or various applications (e.g., an application 370) executed in the OS. For example, the OS may be Android, iOS, Windows, Symbian, Tizen, Bada, and the like.

Referring to FIG. 3, the programming module 310 may include a kernel 320, a middleware 330, an API 360, and/or the application 370.

The kernel 320 (e.g., the kernel 141 in FIG. 1) may include a system resource manager 321 and/or a device driver 323. The system resource manager 321 may include, for example, a process manager (not illustrated), a memory manager (not illustrated), and a file system manager (not illustrated). The system resource manager 321 may perform the control, allocation, recovery, and/or the like of system resources. The device driver 323 may include, for example, a display driver (not illustrated), a camera driver (not illustrated), a BT driver (not illustrated), a shared memory driver (not illustrated), a USB driver (not illustrated), a keypad driver (not illustrated), a Wi-Fi driver (not illustrated), and/or an audio driver (not illustrated). Also, according to an embodiment of the present disclosure, the device driver 312 may include an inter-process communication (IPC) driver (not illustrated).

The middleware 330 may include multiple modules previously implemented so as to provide a function used in common by the applications 370. Also, the middleware 330 may provide a function to the applications 370 through the API 360 in order to enable the applications 370 to efficiently use limited system resources within the electronic device. For example, as illustrated in FIG. 3, the middleware 330 (e.g., the middleware 132) may include at least one of a runtime library 335, an application manager 341, a window manager 342, a multimedia manager 343, a resource manager 344, a power manager 345, a database manager 346, a package manager 347, a connectivity or connection manager 348, a notification manager 349, a location manager 350, a graphic manager 351, a security manager 352, and any other suitable and/or similar manager(s).

The runtime library 335 may include, for example, a library module used by a complier, in order to add a new function by using a programming language during the execution of the application(s) 370. According to an embodiment of the present disclosure, the runtime library 335 may perform functions which are related to input and output, the management of a memory, an arithmetic function, and/or the like.

The application manager 341 may manage, for example, a life cycle of at least one of the applications 370. The window manager 342 may manage graphical user interface (GUI) resources used on the screen. The multimedia manager 343 may detect a format used to reproduce various media files and may encode or decode a media file through a codec appropriate for the relevant format. The resource manager 344 may manage resources, such as a source code, a memory, a storage space, and/or the like of at least one of the applications 370.

The power manager 345, as illustrated in FIG. 3, may operate together with a basic input/output system (BIOS), may manage a battery or power, and may provide power information and the like used for an operation. The database manager 346 may manage a database in such a manner as to enable the generation, search and/or change of the database to be used by at least one of the applications 370. The package manager 347 may manage the installation and/or update of an application distributed in the form of a package file.

The connectivity or connection manager 348 may manage a wireless connectivity such as, for example, Wi-Fi and BT. The notification manager 349 may display or report, to the user, an event such as an arrival message, an appointment, a proximity alarm, and the like in such a manner as not to disturb the user. The location manager 350 may manage location information of the electronic device. The graphic manager 351 may manage a graphic effect, which is to be provided to the user, and/or a user interface related to the graphic effect. The security manager 352 may provide various security functions used for system security, user authentication, and the like. According to an embodiment of the present disclosure, when the electronic device (e.g., the electronic device 100) has a telephone function, the middleware 330 may further include a telephony manager (not illustrated) for managing a voice telephony call function and/or a video telephony call function of the electronic device.

The middleware 330 may generate and use a new middleware module through various functional combinations of the above-described internal element modules. The middleware 330 may provide modules specialized according to types of OSs in order to provide differentiated functions. Also, the middleware 330 may dynamically delete some of the existing elements, or may add new elements. Accordingly, the middleware 330 may omit some of the elements described in the various embodiments of the present disclosure, may further include other elements, or may replace the some of the elements with elements, each of which performs a similar function and has a different name.

The API 360 (e.g., the API 133) is a set of API programming functions, and may be provided with a different configuration according to an OS. In the case of Android or iOS, for example, one API set may be provided to each platform. In the case of Tizen, for example, two or more API sets may be provided to each platform.

The applications 370 (e.g., the applications 134) may include, for example, a preloaded application and/or a third party application. The applications 370 (e.g., the applications 134) may include, for example, a home application 371, a dialer application 372, a short message service (SMS)/multimedia message service (MMS) application 373, an instant message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, and any other suitable and/or similar application(s).

At least a part of the programming module 310 may be implemented by instructions stored in a non-transitory computer-readable storage medium. When the instructions are executed by one or more processors (e.g., the one or more processors 210), the one or more processors may perform functions corresponding to the instructions. The non-transitory computer-readable storage medium may be, for example, the memory 220. At least a part of the programming module 310 may be implemented (e.g., executed) by, for example, the one or more processors 210. At least a part of the programming module 310 may include, for example, a module, a program, a routine, a set of instructions, and/or a process for performing one or more functions.

Figure 4:
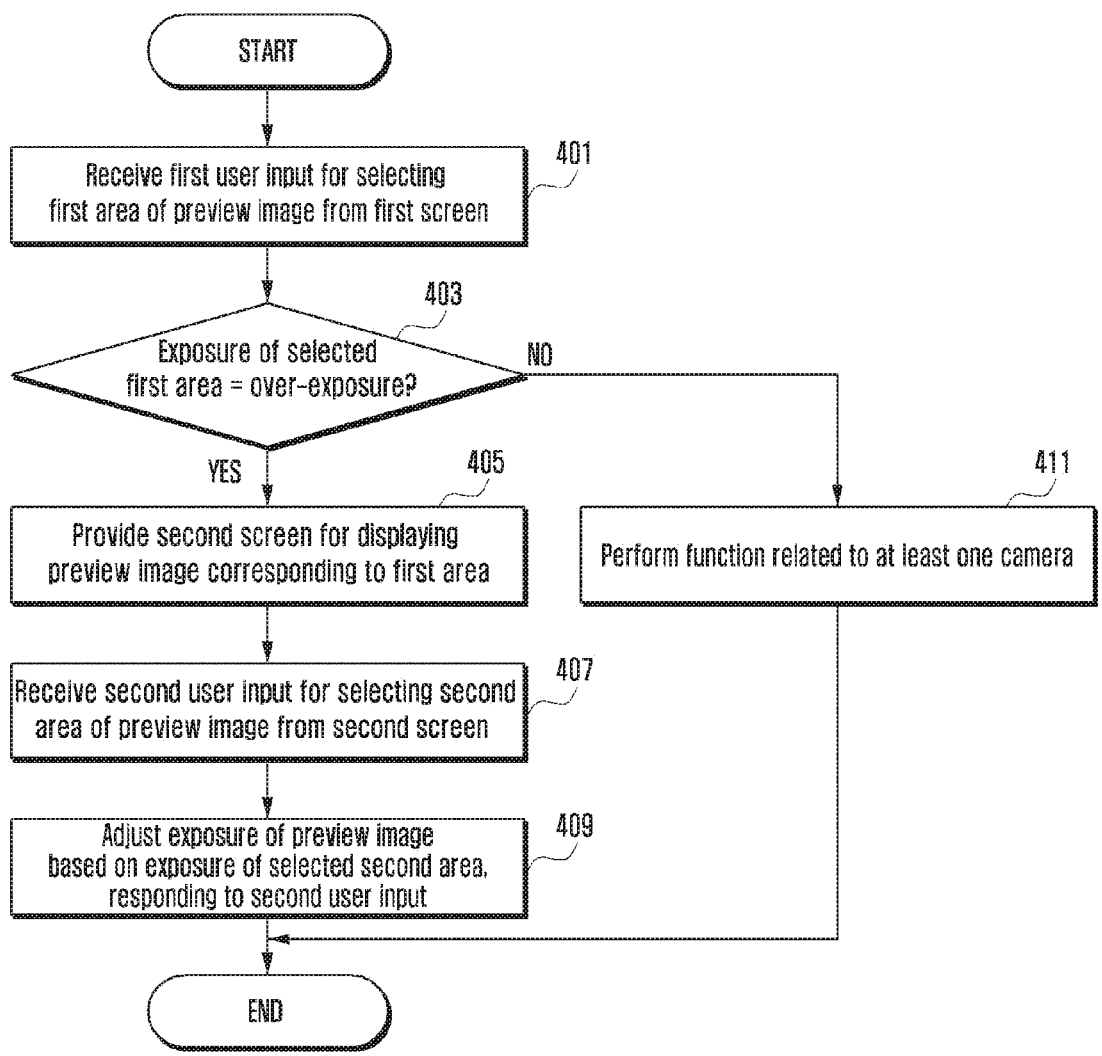
FIG. 4 is a flowchart illustrating operations for adjusting an exposure in the electronic device of FIG. 2 according to various embodiments of the present disclosure.

FIG. 4 is a flowchart illustrating operations for adjusting an exposure in the electronic device 201 of FIG. 2 according to various embodiments of the present disclosure.

Referring to FIG. 4, the electronic device 201 receives a first user input for selecting a first area of a panorama image from a first screen for displaying the preview image at operation 401. The electronic device 201 can obtain the preview image through a camera module 291 responding to a request for executing a camera application, and display the obtained preview image through a display or display module 260. The electronic device 201 can receive a user input for selecting a partial area of the preview image from a screen for displaying the preview image.

Figure 5:
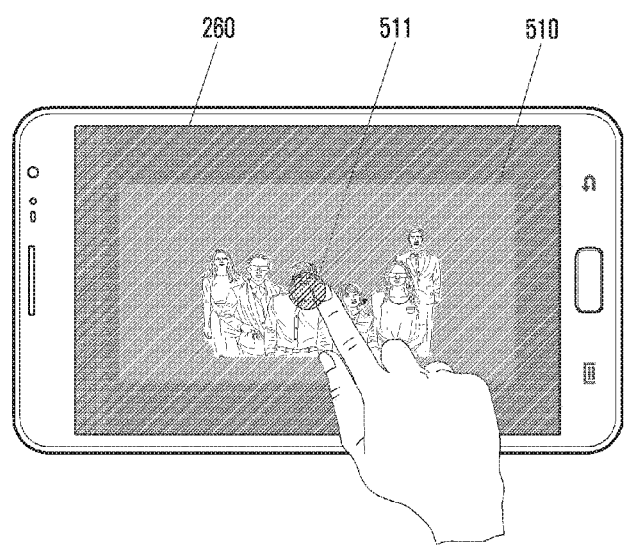
FIG. 5 illustrates an operation of selecting a first area of a preview image from a first screen for displaying the preview image in an electronic device according to various embodiments of the present disclosure.

FIG. 5 illustrates an operation of selecting a first area of a preview image from a first screen for displaying the preview image in an electronic device according to various embodiments of the present disclosure.

Referring to FIGS. 2, 3, 4 and 5, the electronic device 201 can display the preview image obtained from the camera module 291 through a first screen 510 of the display module 260, and receive a first user input 511 for selecting a first area of the preview image from the first screen 510.

The electronic device 201 identifies whether an exposure state of the selected first area is an over-exposure state at operation 403. The electronic device 201 can identify whether the exposure state of the first area is an over-exposure state by using an average brightness value of the first area and brightness values of each of the unit sections 610 through 690 (illustrated in FIG. 6).

The electronic device 201 according to various embodiments of the present disclosure can calculate an average brightness value of a preview image by collecting brightness values of each of the unit sections 610 through 690 in the first area. The electronic device 201 can identify brightness values of each unit section (for example, pixels) in the first area, and calculate the average brightness value of the first area by collecting the identified brightness values.

Figure 6:
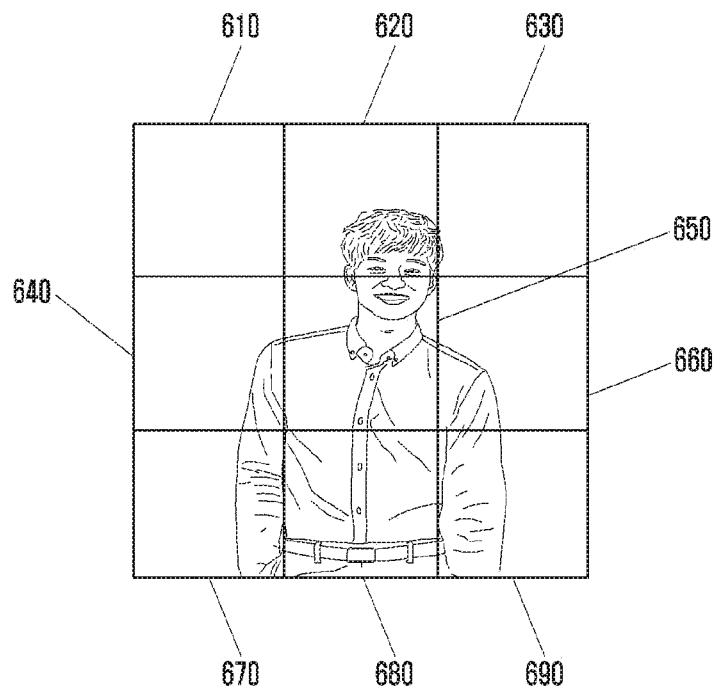
FIG. 6 illustrates a method of collecting brightness values of each unit section in a first area of a preview image in an electronic device according to various embodiments of the present disclosure, and a graph indicating the brightness values of each of the unit sections.
Figure 6:
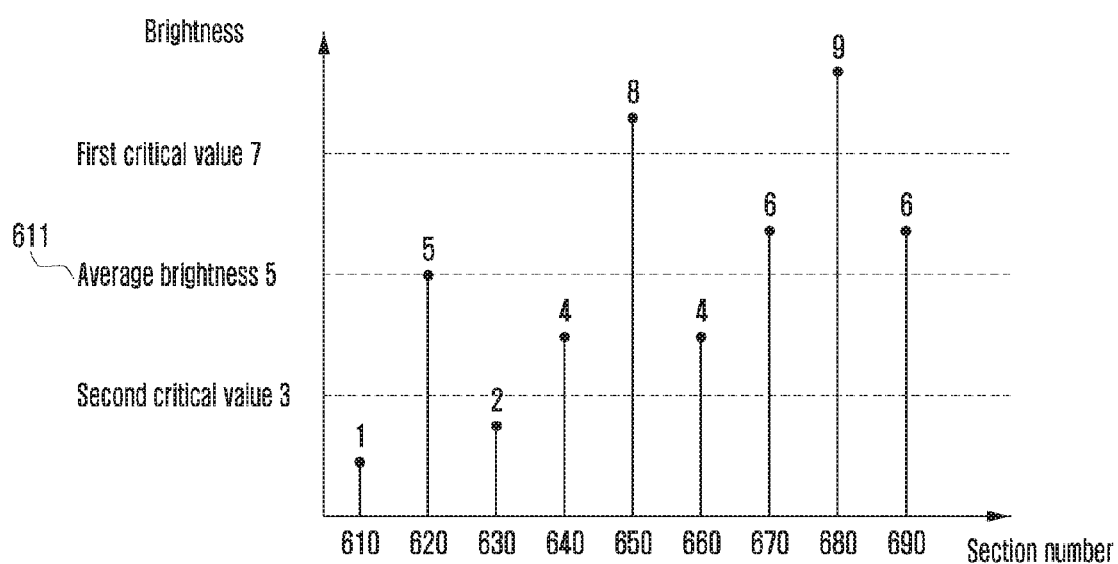

FIG. 6 illustrates a method of collecting brightness values of each unit section in a first area of a preview image in an electronic device according to various embodiments of the present disclosure, and a graph indicating the brightness values for each of the unit sections.

Referring to reference number or object 601 of FIG. 6, the electronic device 201 can collect brightness values of a first unit section 610, a second unit section 620, a third unit section 630, a fourth unit section 640, a fifth unit section 650, a sixth unit section 660, a seventh unit section 670, an eighth unit section 680, and a ninth unit section 690 configuring the first area. The electronic device 201 can calculate and determine an average brightness value of the first area from the collected brightness values of the first unit section 610 to the ninth unit section 690. The electronic device 201 according to various embodiments of the present disclosure can identify the brightness values by setting each unit section of the first area in a pixel unit, and calculate the average brightness value of the first area by setting each unit section in a predetermined block unit and identifying the brightness values in the predetermined block unit.

The electronic device 201 according to various embodiments of the present disclosure can identify whether a ratio of unit sections having a difference greater than a predetermined value from the average brightness value of the first area is greater than a predetermined ratio. The electronic device 201 can identify unit sections having a difference greater than the predetermined value from the average brightness value of the first area. Referring to reference number or object 602 of FIG. 6, the electronic device 201 can calculate an average brightness value 611 (for example, average brightness value=5) of the first area by collecting brightness values of the first unit section 610 to ninth unit section 690, and identify that unit sections having the difference greater than the predetermined value from the average brightness value (for example, greater than a first critical value or less than a second critical value) are first unit section 610, third unit section 630, fifth unit section 650, and eighth unit section 680, as an example.

The electronic device 201 according to various embodiments of the present disclosure can determine that the exposure state of the first area is an over-exposure state, if the ratio of unit sections having a difference greater than a predetermined value from the average brightness value is equal to or greater than a predetermined ratio. Referring to reference number or object 602 of FIG. 6, in case that the predetermined ratio is 30%, the ratio of unit sections having a difference greater than the predetermined value from the average brightness value of the first area is approximately 45% (4 sections from total 9 sections), and thereby the electronic device 201 can determine that the exposure state of the first area is an over-exposure state. The electronic device 201 can determine that the exposure state of the first area is not an over-exposure but a proper exposure state, if the ratio of unit sections having a difference greater than a predetermined value from the average brightness value is less than a predetermined ratio.

The electronic device 201 provides a second screen for displaying a preview image corresponding to the first area at operation 405, if the exposure state of the first area is an over-exposure state. The electronic device 201 according to various embodiments of the present disclosure can provide a second screen 720 displaying an image enlarged from a preview image corresponding a first area 711 through a specific area of the first screen 710.

Figure 7A:
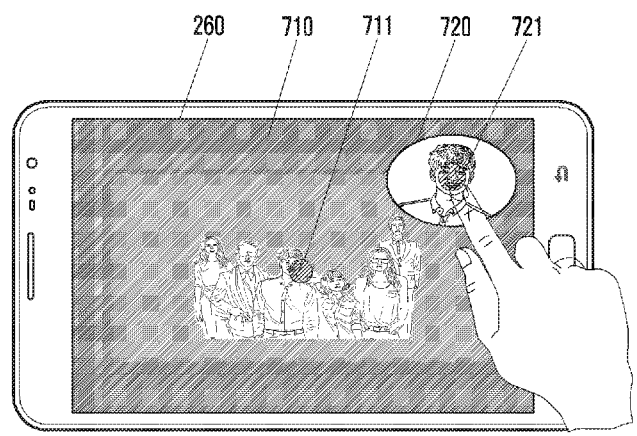
FIG. 7A illustrates an operation of providing a second screen for displaying an image enlarged from a preview image corresponding to a first area through at least a partial area of a first screen in an electronic device according to various embodiments of the present disclosure.

FIG. 7A illustrates an operation of providing a second screen for displaying an image enlarged from a preview image corresponding to a first area through at least a partial area of a first screen in an electronic device according to various embodiments of the present disclosure.

Referring to FIG. 7A, the electronic device 201 can provide the first screen 710 for displaying a preview image through the whole display or display module 260, and provide the second screen 720 through a specific area of the first screen 710.

The electronic device 201 according to various embodiments of the present disclosure can provide a second screen for displaying a preview image corresponding to a first area through the whole display module 260, and provide a first screen for displaying the whole preview image through a specific area of the second screen, if the exposure state of the first area is an over-exposure state.

Figure 7B:
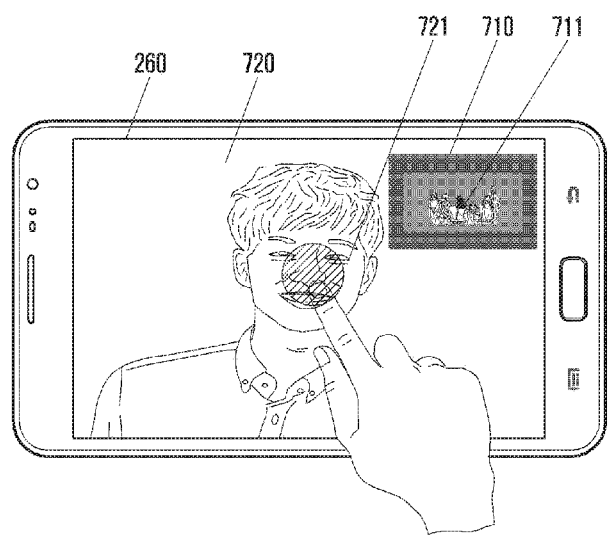
FIG. 7B illustrates an operation of providing a second screen for displaying a preview image corresponding to a first area through the whole or entire display or display module in an electronic device according to various embodiments of the present disclosure.

FIG. 7B illustrates an operation of providing a second screen for displaying a preview image corresponding to a first area through the whole display module in an electronic device according to various embodiments of the present disclosure.

Referring to FIG. 7B, the electronic device 201 can provide a second screen 720 for displaying a preview image corresponding to a first area 711 through the whole display module 260, if the exposure state of the first area 711 is an over-exposure state. The electronic device 201 can provide a first screen for displaying the whole preview image through a specific area of the second screen 720.

The electronic device 201 according to various embodiments of the present disclosure can provide an exposure adjustment slide bar through at least a partial area of the first screen, if the exposure state of first area is an over-exposure state.

Figure 7C:
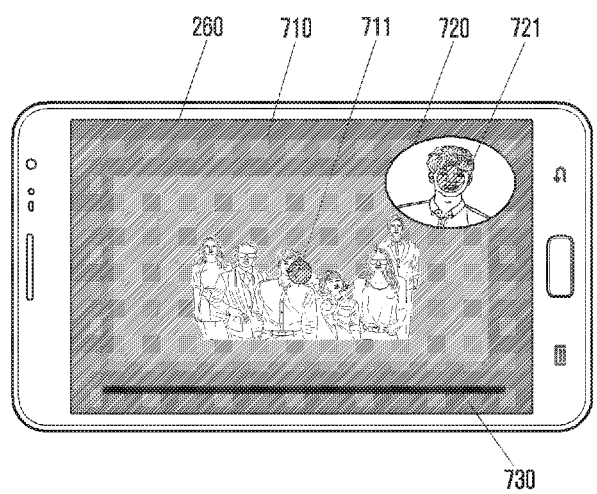
FIG. 7C illustrates an operation of providing an exposure adjustment slide bar through at least a partial area of a first screen in an electronic device according to various embodiments of the present disclosure.

FIG. 7C illustrates an operation of providing an exposure adjustment slide bar through at least a partial area of a first screen in an electronic device according to various embodiments of the present disclosure.

Referring to FIG. 7C, the electronic device 201 can provide an exposure adjustment slide bar 730 in the bottom area of the first screen 710, and adjust an exposure of the preview image through the slide bar.

The electronic device 201 receives a second user input for selecting a second area of a preview image from the second screen at operation 407 (illustrated in FIG. 4). Referring to FIG. 7A, the electronic device 201 can receive a second user input for selecting a second area 721 of the preview image from the second screen 720 provided in at least a partial area of the first screen 710. Referring to FIG. 7B as another example, the electronic device 201 can receive a second user input for selecting a second area of the preview image from a second screen 720 provided through the whole display module 260. In this case, a user of the electronic device 201 can select the second area 721 including exposure state information in order to adjust an exposure related to more easily comparing to FIG. 7A.

The electronic device 201 according to various embodiments of the present disclosure can receive a second user input through an exposure adjustment slide bar 730 provided in the first screen. Referring to FIG. 7C, the electronic device 201 can provide an exposure adjustment slide bar in the bottom area of the first screen 710, and receive a user input for adjusting an exposure through the exposure adjustment slide bar 730 (e.g., by sliding the exposure adjustment slide bar 730 by touch).

The electronic device 201 adjusts the exposure of the preview image based on the exposure state of the selected second area responding the second user input at operation 409. Referring to FIG. 7A, the electronic device 201 can identify an exposure state of the selected second area 721 from the second screen 720, and identify a brightness value of the second area 721 corresponding to the exposure state of the second area 721. The electronic device 201 can adjust an exposure of the preview image based on the brightness value of the second area 721. The method of adjusting an exposure of a preview image can be performed by determining an exposure parameter value corresponding to a brightness value of a specific area and controlling a camera module according to the exposure parameter value as previously described.

The electronic device 201 according to various embodiments of the present disclosure can adjust an exposure of the preview image based on a user input received through the exposure adjustment slide bar. Referring to FIG. 7C, the electronic device 201 can provide an exposure adjustment slide bar through at least a partial area of the first screen 710, and adjust an exposure of the preview image based on the user input for adjusting the exposure adjustment slide bar 730.

The electronic device 201 can perform a function related to at least one camera at operation 411, if the exposure state of the first area is a proper exposure state. The function related to at least one camera may include a function of maintaining a display of a preview image to take an image, image capturing function, or video recording function.

The term "module" used in the present disclosure may refer to, for example, a unit including one or more combinations of hardware, software, and firmware. The "module" may be interchangeable with a term, such as "unit," "logic," "logical block," "component," "circuit," or the like. The "module" may be a minimum unit of a component formed as one body or a part thereof. The "module" may be a minimum unit for performing one or more functions or a part thereof. The "module" may be implemented mechanically or electronically. For example, the "module" according to an embodiment of the present disclosure may include at least one of an application-specific IC (ASIC) chip, a field-programmable gate array (FPGA), and a programmable-logic device for performing certain operations which have been known or are to be developed in the future.

Examples of computer-readable media include: magnetic media, such as hard disks, floppy disks, and magnetic tape; optical media such as compact disc ROM (CD-ROM) and DVD; magneto-optical media, such as floptical disks; and hardware devices that are specially configured to store and perform program instructions (e.g., programming modules), such as ROM, RAM, flash memory, etc. Examples of program instructions include machine code instructions created by assembly languages, such as a compiler, and code instructions created by a high-level programming language executable in computers using an interpreter, etc. The described hardware devices may be configured to act as one or more software modules in order to perform the operations and methods described above, or vice versa.

Modules or programming modules according to the embodiments of the present disclosure may include one or more components, remove part of them described above, or include new components. The operations performed by modules, programming modules, or the other components, according to the present disclosure, may be executed in serial, parallel, repetitive or heuristic fashion. Part of the operations can be executed in any other order, skipped, or executed with additional operations.

A method for adjusting a camera exposure in an electronic device according to various embodiments of the present disclosure can identify an exposure state of a partial area selected by a user from the whole area of a preview image, and provide a screen for adjusting an exposure correctly based on the identification result of the exposure state.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
    at least one camera configured to obtain a preview image;
    a display configured to display the preview image; and
    a processor configured to:
        receive a first user input for selecting a first area of the preview image from a first screen for displaying the preview image,
        identify an exposure state of the selected first area in response to the first user input,
        provide a second screen for displaying a portion of the preview image corresponding to the selected first area if the exposure state of the selected first area is an over-exposure state,
        receive a second user input for selecting a second area of the preview image from the second screen, and
        adjust an exposure of the preview image based on the exposure state in response to the second user input.

2. The electronic device of claim 1, wherein the processor is further configured to:
    calculate an average brightness value of the first area by collecting brightness values of each unit section in the first area, and
    identify whether a ratio of unit sections having a difference greater than a predetermined value from the average brightness value of the first area is equal to or greater than a predetermined ratio.

3. The electronic device of claim 2, wherein the processor is further configured to determine that the exposure state of the first area is an over-exposure state, if the ratio of unit sections having a difference greater than a predetermined value from the average brightness value of the first area is equal to or greater than a predetermined ratio.

4. The electronic device of claim 2, wherein the processor is further configured to determine that the exposure state of the first area is a proper exposure state, if the ratio of unit sections having a difference greater than a predetermined value from the average brightness value of the first area is less than a predetermined ratio.

5. The electronic device of claim 1, wherein the processor is further configured to provide the second screen for displaying an image enlarged from the preview image corresponding to the first area through at least a partial area of the first screen.

6. The electronic device of claim 1, wherein the processor is further configured to:
provide the second screen for displaying the preview image corresponding to the first area through the entire display, and
provide the first screen for displaying the entire preview image through at least a partial area of the second screen.

7. The electronic device of claim 1, wherein the processor is further configured to:
provide the second screen for displaying the preview image corresponding to the first area through the whole display module, and
provide the first screen for displaying the entire preview image through at least a partial area of the second screen.

8. The electronic device of claim 1, wherein the processor is further configured to:
provide an exposure adjustment slide bar through at least a partial area of the first screen if the exposure state of the first area is an over-exposure state, and
adjust an exposure of the preview image based on a user input received through the exposure adjustment slide bar.

9. The electronic device of claim 1, wherein the processor is further configured to perform a function related to the at least one camera if the exposure state of the first area is a proper exposure state.

10. The electronic device of claim 1, wherein the processor is further configured to obtain the preview image through the at least one camera module responding to a request for executing a camera application.

11. A method for operating an electronic device, the method comprising:
receiving a first user input for selecting a first area of a preview image from a first screen for displaying the preview image;
identifying an exposure state of the selected first area in response to the first user input;
providing a second screen for displaying a portion of the preview image corresponding to the first area if the exposure state of the selected first area is an over-exposure state;
receiving a second user input for selecting a second area of the preview image from the second screen; and
adjusting an exposure of the preview image based on the exposure state of the selected second area in response to the second user input.

12. The method of claim 11, wherein the identifying of the exposure state comprises:
calculating an average brightness value by collecting brightness values of each unit section in the first area; and
identifying whether a ratio of unit sections having a difference greater than a predetermined value from the average brightness value of the first area is equal to or greater than a predetermined ratio.

13. The method of claim 12, wherein the identifying of the exposure state comprises:
determining that the exposure state of the first area is a proper exposure state, if the ratio of unit sections having a difference greater than a predetermined value from the average brightness value of the first area is less than a predetermined ratio.

14. The method of claim 11, wherein the identifying of the exposure state comprises:
determining that the exposure state of the first area is a proper exposure state, if the ratio of unit sections having a difference greater than a predetermined value from the average brightness value of the first area is less than a predetermined ratio.

15. The method of claim 11, wherein the providing of the second screen comprises:
providing the second screen for displaying an image enlarged from the preview image corresponding to the first area through at least a partial area of the first screen.

16. The method of claim 12, wherein the providing of the second screen comprises:
providing the second screen for displaying the preview image corresponding to the first area through the whole display module; and
providing the first screen for displaying the entire preview image through at least a partial area of the second screen.

17. The method of claim 11, wherein the providing of the second screen comprises:
providing the second screen for displaying the preview image corresponding to the first area through the whole display module; and
providing the first screen for displaying the entire preview image through at least a partial area of the second screen.

18. The method of claim 11, further comprising:
providing an exposure adjustment slide bar through at least a partial area of the first screen if the exposure state of the first area is an over-exposure state; and
adjusting an exposure of the preview image based on a user input received through the exposure adjustment slide bar.

19. The method of claim 11, further comprising:
performing a function related to the at least one camera if the exposure state of the first area is a proper exposure state.

20. The method of claim 11, further comprising:
obtaining the preview image through the at least one camera module responding to a request for executing a camera application.

* * * * *